(12) United States Patent
Ibrahim et al.

(10) Patent No.: US 6,948,128 B2
(45) Date of Patent: *Sep. 20, 2005

(54) NONLINEAR EDITING SYSTEM AND METHOD OF CONSTRUCTING AN EDIT THEREIN

(75) Inventors: Peter Ibrahim, Montreal (CA); Christopher B. Lea, Montreal-North (CA); Adam D. Barr, Redmond, WA (US); Raymond Hill, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 55 days.

This patent is subject to a terminal disclaimer.

(21) Appl. No.: 10/731,545

(22) Filed: Dec. 9, 2003

(65) Prior Publication Data

US 2004/0117730 A1 Jun. 17, 2004

Related U.S. Application Data (63) Continuation of application No. 09/662,090, filed on Sep. 14, 2000, now Pat. No. 6,664,966, which is a continuation of application No. 08/771,447, filed on Dec. 20, 1996, now abandoned.

(51) Int. Cl.$^7$ .............................................. G06F 15/16
(52) U.S. Cl. ........................ 715/723; 715/716; 715/731
(58) Field of Search ................................ 715/716, 723, 715/731; 345/474

(56) References Cited

U.S. PATENT DOCUMENTS

| | | | | |
|---|---|---|---|---|
| 5,355,450 A | * | 10/1994 | Garmon et al. | 345/501 |
| 5,659,793 A | * | 8/1997 | Escobar et al. | 715/500.1 |
| 5,729,673 A | * | 3/1998 | Cooper et al. | 345/427 |
| 5,892,506 A | * | 4/1999 | Hermanson | 715/500.1 |
| 6,204,840 B1 | * | 3/2001 | Petelycky et al. | 715/500.1 |
| 6,266,053 B1 | * | 7/2001 | French et al. | 715/500.1 |
| 6,414,686 B1 | * | 7/2002 | Protheroe et al. | 345/474 |
| 6,664,966 B1 | * | 12/2003 | Ibrahim et al. | 345/474 |

* cited by examiner

*Primary Examiner*—Mehmet B. Geckil
(74) *Attorney, Agent, or Firm*—Peter J. Gordon

(57) ABSTRACT

A nonlinear editing system for audio, video and/or other source materials comprises a system to define at least one time line representing the edit, the time line being represented in the editing system as an operator graph. The operator graph includes operators, representing sources and time-based effects, and time varying connections therebetween. For each period of the defined time line wherein the connections do not change, a expression tree comprising a simplified representation of the operators and the connections required to render that portion of the time line is extracted. Each expression tree can be examined to ensure that all of the required sources and/or connections are available to render that portion of the time line in real time and, if this is not the case, a determination can be made of which portions of the expression tree can be pre-rendered to an intermediate result, the intermediate result being substituted into expression tree to provide real time rendering.

21 Claims, 8 Drawing Sheets

NONLINEAR EDITING SYSTEM AND METHOD OF CONSTRUCTING AN EDIT THEREIN

CROSS-REFERENCE TO RELATED APPLICATIONS

This application claims the benefit under 35 U.S.C. §120, and is a continuing application of:

application Ser. No. 09/662,090, filed on Sep. 14, 2000 now U.S. Pat. 6,664,966, which is a continuing application of:

application Ser. No. 08/771,447, filed on Dec. 20, 1996, abandoned; both of which are incorporated herein by reference.

FIELD OF INVENTION

The present invention relates to a non-linear editing system and method for editing video and audio source information and the like. More specifically, the present invention relates to a non-linear editing system and a method of constructing and/or rendering an edit therewith.

BACKGROUND OF THE INVENTION

Non-linear video editing systems are known and include systems manufactured by AVID, Quantel and other and the SOFTIMAGE | Eddie system sold by the assignee of the present invention. Non linear video editing systems allow a user to join, manipulate and/or modify digital or digitized information from various video sources to create a finished work for rendering to an appropriate storage media or output. The sources generally need not be accessed in a linear manner and are instead accessed as required, i.e.—the last three seconds of a ten second video clip can be accessed without accessing the first seven seconds or individual video frames can be accessed and/or combined as desired. Non-linear audio editing systems are also known and allow a user to select, join, manipulate and modify digital or digitized audio sources within imposing linear access requirements.

For example, a non-linear video editor can be used to construct the video portion of a television advertisement for a new model of a car, by connecting digitized video clips of the new car driving on a country road, digital video clips of a driver in the car and digitized video clips of the car in a wind test tunnel with engineers standing about it. A non-linear audio editor can be used to create an audio soundtrack for the advertisement, comprising a selection of classic music mixed with a narrator's voice-over discussing the features of the car. The audio and video edits are then rendered to an appropriate sink, such as a VTR, RAID array, or a monitor, to obtain the finished commercial.

For the video edit, the user of the editor selects the desired video sources, their duration and order and the types of transitions between them (fades, dissolves, wipes, blends, etc.). A similar process is followed for the audio edit.

Generally, when an edit is created with such systems, a data structure or file is produced which represents the edit and defines hows the sources, such as CD's or file storage systems and linear sources, if present, such as CD's and VTR's; functions, such as dissolves, wipes, etc.; and sinks, such as DAT's, VTR's, CD-R's, file storage systems etc. are to be manipulated to render the edit. Depending upon the edit and the edit system, it may be required to 'render' the edit to a sink for subsequent playback or the edit may be run in real time.

Problems exist with the prior art non-linear editing systems of which the present inventors are aware. For example, in many systems of which the inventors are aware, video and audio edits are performed with separate editors, or in separate edit modules which may have different and/or inconsistent user interfaces. Further, in some systems it is difficult or onerous to insert a clip into an edit, if subsequent clips are to be displaced along the edit.

Perhaps more troubling is the fact that prior art systems may include a variety of redundant entries in the data structure or file which represents the edit, thus utilizing memory and/or system capacity which would otherwise not be required for the edit. Also, in the prior art systems it is difficult to determine if an edit which has been created can be rendered in real time or whether portions of the edit must be pre-rendered. In this latter case, it can be required that the user of the editor determine which portions of the edit should be pre-rendered.

It is therefore desired to have a non-linear editing system which can operate on both video and/or audio information with a consistent user interface, a system which can determine relatively simply and effectively whether a edit can be performed in real time and a system which makes reasonably efficient use of the memory and hardware available to the editing system.

SUMMARY OF THE INVENTION

It is an object of the present invention to provide a novel non-linear editing system and a novel method of non-linear editing which obviates or mitigates at least one of the disadvantages of the prior art non-linear editing systems and methods.

According to a first aspect of the present invention, there is provided a method of constructing an edit in a nonlinear editing system, comprising the steps of:

(i) defining at least one time line representing an edit of source materials;

(ii) constructing a graph of operators which corresponds to said defined at least one time line, operators in said graph representing sources, functions and/or effects employed in said at least one time line and said graph representing connections between said operators, said connections changing with time according to said defined time line;

(iii) for each time period between said connection changes in each said at least one time line, extracting an expression tree from said graph of operators which represents the operators and connections therebetween in said time period; and (iv) processing each said extracted expression tree in time order to render said time line.

According to another aspect of the present invention, there is provided a nonlinear editing system for editing source information to construct and render an edit, comprising:

storage means to store source information;

a graphical user interface with which a user can construct a time line from said source information and one or more effects or functions;

graph means to construct an operator graph comprising two or more operators, each of said operators corresponding to a source, effect or function in said time line, and at least one connection representing the relationship between said two or more operators, said at least one connection changing at time points in accordance with said time line;

extraction means to extract at least one expression tree from said operator graph, said at least one expression tree representing the sources, effects and functions and the connections therebetween required to render a portion of said time line between connection changes; and rendering means responsive to said at least one expression tree to render the portion of said time line represented by said expression tree.

BRIEF DESCRIPTION OF THE DRAWINGS

Preferred embodiments of the present invention will now be described, by way of example only, with reference to the attached Figures, wherein:

FIGS. 8a through 8g show expression trees extracted from the operator graph of FIG. 5;

DETAILED DESCRIPTION OF THE INVENTION

Some prior art non-linear editing systems (NLE's) employ a time line metaphor to represent an edit wherein various clips are identified as linear durations with the axis of the time line representing time in the edit. Generally, each duration in a time line is bounded by a transition, such as the start or end of the edit, an effect or a source. Also, as used herein, the end of points of durations and/or time span are not inclusive, i.e.—a duration from 0 to 2 seconds commences at time equals zero and extends up to, but not including, time equals 2 seconds.

Figure 1:
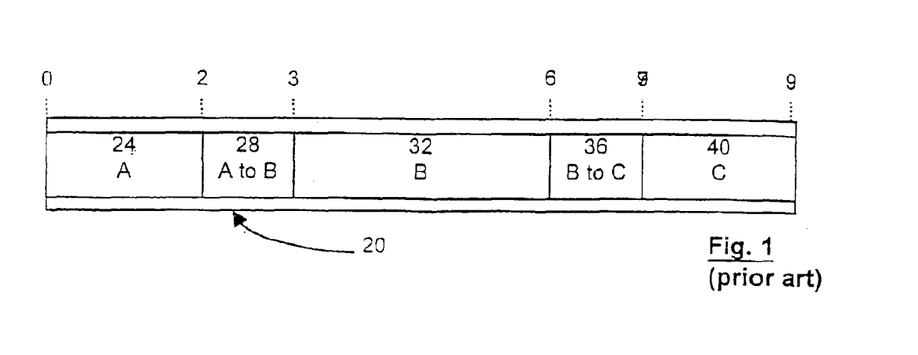
FIG. 1 shows a prior art time line of an edit.

An example of a prior art video edit time line 20 is shown in FIG. 1. Time line 20, which has a total duration of nine seconds, comprises three video clips, identified as 'A', 'B' and 'C' with dissolves, identified as 'A to B' and 'B to C', as transitions between them. In time line 20, video clip A plays for a duration 24 of two seconds (from 0 to 2) and then dissolves, at A to B, for a duration 28 of one second (from 2 to 3) from video clip A into a video clip B. Video clip B plays for a duration 32 of three seconds (from 3 to 6) and then dissolves, at B to C, for a duration 36 of one second (from 6 to 7), from video clip B into a video clip C. Video clip C plays for a duration 40 of two seconds (from 7 to 9) and then time line 20 ends after its total duration of nine seconds.

In an embodiment of the present invention, video clip durations are represented on the time line by 'thumbnail' representations of the clip contents. For example, a short duration may be represented by a thumbnail image of the first frame of a video clip which is used in the duration, the frame being appropriately scaled to the displayed size of the duration on the time line. Longer durations can be represented by multiple thumbnail images, for example the first and last frame of the video clip used in the duration may be employed. The use of such thumbnail images provides the user of the NLE system with a useful indication of the contents of the clip.

Figure 2:
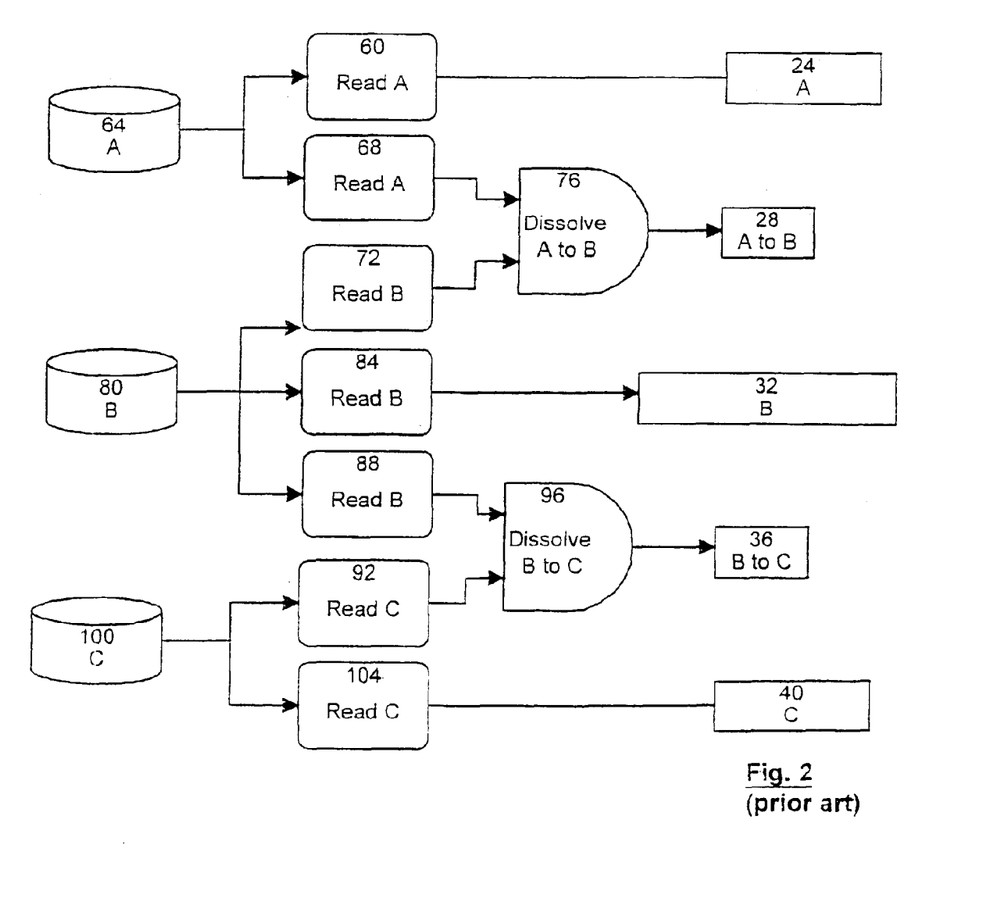
FIG. 2 shows a prior art representation of the time line of FIG. 1.

FIG. 2 shows one possible prior art configuration for rendering time line 20. As used herein, the term 'render' is intended to comprise both real time rendering of the edit to a video and/or audio monitor and static rendering of the edit to a recording device such as a RAID array, etc. As shown in the Figure, duration 24, from zero to two seconds, is provided by a Read A function 60 which can read and deliver two seconds of video clip 'A' from the device 64 on which 'A' is stored. Device 64 can be any suitable storage device such as a VTR or file storage system. In many circumstances wherein digital video information is manipulated, such file storage systems will comprise RAID arrays which are preferred primarily for their ability to access digital information in a nonlinear manner and their higher throughput relative to other digital storage devices.

Duration 28, from two to three seconds, is provided by another Read A function 68, a Read B function 72 and a Dissolve A to B function 76. Read A function 68 is similar to Read A function 60 in that it can read and deliver a portion of video clip 'A', specifically a one second duration starting at the two second point in the clip, from device 64. Read B function 72 can read and deliver one second of video clip 'B' from the device 80 on which 'B' is stored. Device 80 can be the same device as device 64 or can be any other suitable storage device. Dissolve A to B function 76 receives video clips 'A' and 'B' from functions 68 and 72 and provides a one second dissolve between them for duration 28. Function 76 can be a hardware dissolve unit or an equivalent implemented in software.

Duration 32, from three to six seconds, is provided by another Read B function 84 which operates in a similar manner to Read B function 72 in that it can read three seconds of video clip 'B', starting at the one second point in the clip, from device 80.

Duration 36, from six to seven seconds, is provided by another Read B function 88, which operates in a similar manner to Read B function 72 in that it can read one second of video clip 'B', starting at the four second point in the clip, from device 80, a Read C function 92 and a Dissolve B to C function 96. Read C function 92 can read and deliver one second of video clip 'C' from the device 100 on which 'C' is stored. Device 100 can be the same device as device 64 and/or device 80 or can be any other suitable storage device. Dissolve B to C function 96 receives video clips 'B' and 'C' from functions 88 and 92 and provides a one second dissolve between them for duration 36. Function 96 can be a hardware dissolve unit or an equivalent implemented in software.

Finally, Duration 40, from seven to nine seconds, is provided by another Read C function 104 which can read and deliver two seconds of video clip 'C', starting at the one second point in the clip, from device 100.

As will be apparent to those of skill in the art, the prior art configuration shown in FIG. 2 includes several redundancies in the Read functions and a redundancy in the Dissolve functions. These redundancies can occupy memory which could otherwise be usefully employed in a NLE system and/or can make the efficient utilization of hardware, such as Dissolve functions 76 and 96, difficult to accomplish. For example, there is no differentiation in the configuration of FIG. 2 as to when Dissolve functions 76 and 96 are required. Thus, each Dissolve function is occupied for the entire duration of time line 20 and cannot be used otherwise within the time line. Most editing systems have limited hardware functions, such as dissolves, and thus the redundancies in defining hardware requirements in prior art systems can result in edits not being renderable on a system which would have sufficient hardware if the redundancies were removed.

Further, subsequent modification and amendment of time line 20 can be difficult to process by the prior art NLE system. For example, inserting another video clip 'D' at the four second point of time line 20 (i.e.—in the middle of duration 32) with dissolves from 'B to D' and from 'D to B', can necessitate amendment of each Read function, to update its start time and/or duration length and will require additional Read and/or Dissolve functions.

Another disadvantage of prior art configurations such as that of FIG. 2 is that it can be difficult to determine if the time line represented by this configuration can be rendered in real time. Specifically, the NLE system hardware will have limited data busses available and/or a limited capability to read video clips. Amendment of time line 20 to include another video clip will result in the another read function and/or transitions being added to the configuration of FIG. 2 without consideration of whether the required hardware is available.

Figure 3:
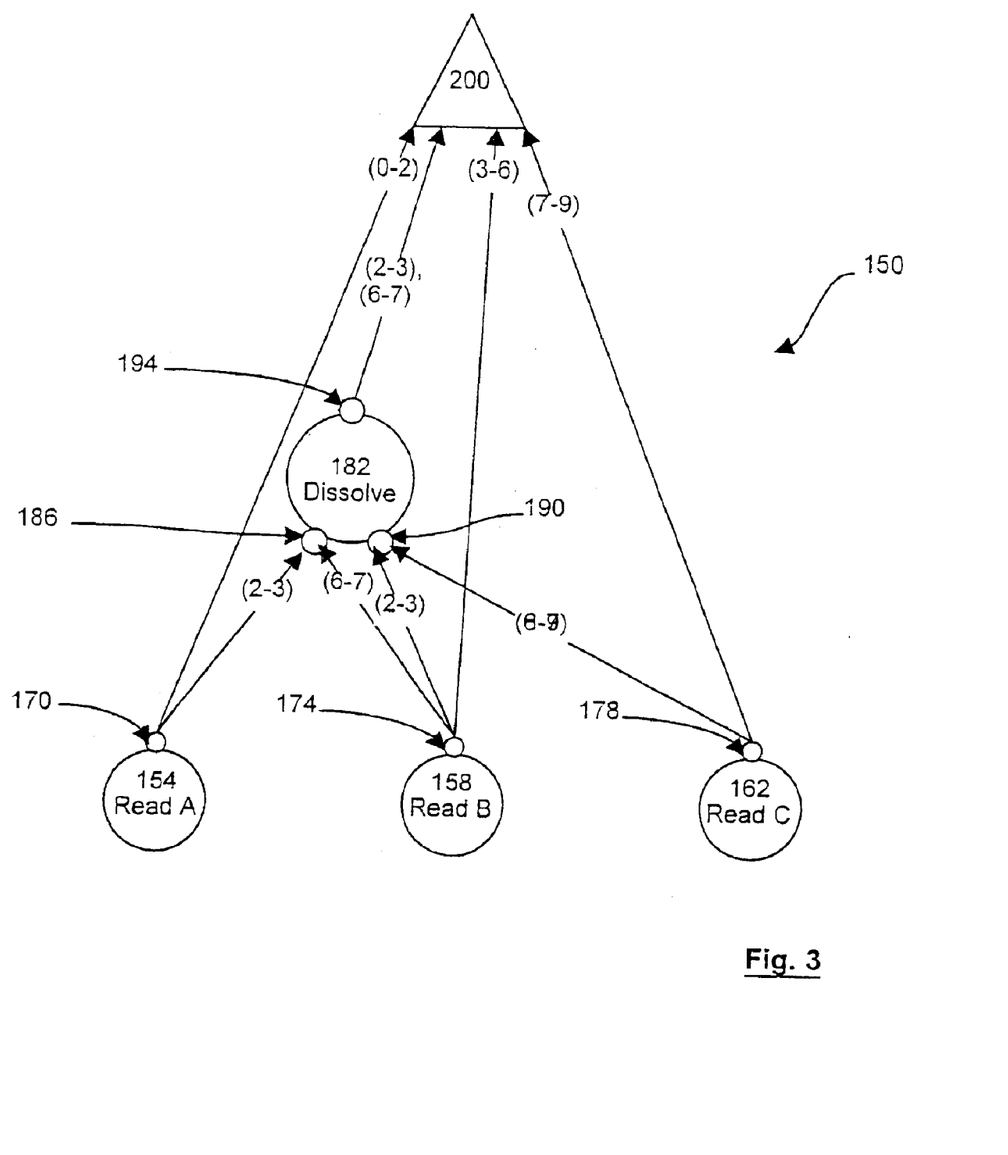
FIG. 3 shows an operator graph in accordance with the present invention implementing the time line of FIG. 1.
Figure 3G:
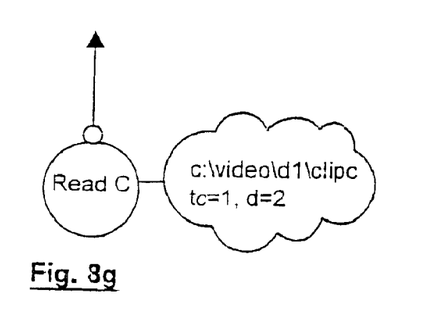

The present inventors have determined that many or all of these disadvantages can be overcome or mitigated by representing the time line constructed with a NLE as an operator graph which provides time-multiplexed connections between edit objects (referred to by the present inventors as operators), which are the nodes in the graph. FIG. 3 shows an operator graph 150 in accordance with the present invention for time line 20 of FIG. 1.

In the present invention, operators are classified by a hierarchy including: Mode; Type; Class; ID; and RT_ID. The Mode classification is an indicator of whether the operator is implemented in generic hardware, is limited to specific hardware, or is emulated via software. For example, a dissolve operation is likely to be implemented in hardware while a fade operation might be implemented in hardware or emulated by software running on a DSP. The classification of operators according to whether they are implemented in hardware allows the NLE system to make efficient use of limited hardware resources.

The Type classification defines the data type which the operator is intended to operate on. Examples of Types include: image, audio, 3D models, etc.

The Class classification defines the operation/effect which the operator performs. For example, the Class classification can include: image filter, image transition, audio filter, etc.

The ID classification is a unique identification of the operator. For example, an image filter Class may have an ID of blur, blend, contrast enhance, etc. while an audio filter Class may have an ID of echo, lowpass, highpass, bandlimit, etc.

The RT_ID classification is a unique identification assigned to each instance of the operator at run time.

In a present embodiment of the invention, the operators and their hierarchy are implemented as a container class objects which may include a variety of appropriate methods and/or data. For example, when queried all operators return their classification. In many circumstances, for performance reasons, effects will be achieved by operators which are implemented in special purpose hardware for performance reasons. In such cases, the operator will merely contain the parameters required to implement the effect on the hardware. For example, a Read operator can contain only a filename, starting offset and path.

In other instances, an operator may contain executable code to implement a method in general purpose hardware. For example, a Dissolve operator might contain the program code to implement a software-implemented dissolve between two sources. Similarly, a filter operator for a filter effect such a "Solarize" filter can contain the program code to implement the filter.

It is also contemplated that an operator may be implemented by both software and hardware. For example, a read operator can include a filename and path and program code to implement conversion of an image from a given resolution to a different resolution.

In FIG. 3, operator graph 150 comprises a Read A operator 154, a Read B operator 158 and a Read C operator 162. Each Read operator 154, 158 and 162 operates to retrieve specified portions, given a start time and duration, of their respective video clips from an associated storage device. This storage device can be a separate storage device for each video clip or a single storage device storing a variety of video and/or audio clips and may comprise a file storage system, such as a RAID array, or any other suitable device or devices as will occur to those of skill in the art.

Each object also includes at least one Port object. For example, each Read operator 154, 158 and 162 includes a Port object 170, 174 and 178 respectively. Port objects 170, 174 and 178 provide and control the interface between Read operators and other functions, filters and effects in operator graph 150.

In operator graph 150, a Dissolve operator 182 includes two input ports 186 and 190 and an output port 194. As might be expected, Dissolve operator 182 implements a dissolve from a video clip supplied at port 186 to a video clip supplied at port 190. The result of this dissolve is output at port 194.

In FIG. 3, for clarity, the time span of a connection is indicated by the times in brackets and these times are displayed in absolute terms, relative to start and duration of time line 20, referred to below as $t_{root}$. As shown, port 170 on Read A operator 154 is connected to the root 200 of operator graph 150 for the time span of $t_{root}=0$ to 2 seconds and to input port 186 on Dissolve operator 182 for the time span of $t_{root}=2$ to 3 seconds. Port 174 on Read B operator 158 is connected to input port 190 of Dissolve operator 182 for the time span of $t_{root}=2$ to 3 seconds, to root 200 for the time span of $t_{root}=3$ to 6 seconds and to input port 186 of Dissolve operator 182 for the time span of $t_{root}=6$ to 7 seconds. Port 178 on Read C operator 162 is connected to input port 190 on Dissolve operator 182 for the time span of $t_{root}=6$ to 7 seconds and to root 200 for the time span of $t_{root}=7$ to 9 seconds. Output port 194 of Dissolve operator 182 is connected to root 200 for the time spans of $t_{root}=2$ to 3 seconds and $t_{root}=6$ to 7 seconds.

In addition to the connections between the operators, which are defined relative to $t_{root}$, each operator receives parameters that define a start time and duration for the clip or effect. For Read operators, the start time is expressed relative to the start of the clip. For example, the connection between port 170 on Read operator 154 and root 200 for $t_{root}=0$ to 2 seconds also includes parameters defining a start time of $t_A=0$ and a duration of 2 seconds. For effects, such as Dissolve operator 182, these additional parameters are passed to Read A operator 154 via port 170 and Read B operator 158 via port 174 which define durations of one second, and start times of $t_A=2$ and $t_B=0$. As with the connection times, these additional parameters are defined by the user of the NLE system as they construct and/or modify time line 20 and are implemented via requests from root 200 to the operators of operator graph 150.

Specifically, root 200 requests port 170 of Read operator 154 to provide two seconds of clip A commencing at time $t_{root}=0$ and $t_A=0$. Similarly, root 200 requests one second of an A to B dissolve, commencing at time $t_{root}=2$, from output port 194 of Dissolve operator 182 and for $t_A=2$ and $t_B=0$. Output port 194 passes requests through Dissolve operator 182 via input ports 186 and 190 to port 170 on Read A operator 154 and port 174 Read B on operator 158 respectively. Port 170 is requested to provide one second of clip A, from time $t_A=2$, to port 186 of Dissolve operator 182 and Read B operator 158 is requested to provide one second of clip B, from time $t_B=0$, to port 190 of Dissolve operator 182.

Root 200 also requests three seconds of clip B from Read B operator 158, commencing at time $t_{root}=3$ and $t_B=1$. Root 200 requests a one second B to C dissolve from output port 194 of Dissolve operator 182 at $t_{root}=6$ and $t_B=4$ and $t_C=0$ which results in input port 186 requesting one second of clip B, starting at time $t_B=4$, from port 174 on Read B operator 158 and in input port 190 requesting one second of clip C, commencing at time $t_C=0$, from port 178 on Read C operator 162. Finally, root 200 requests two seconds of clip C from port 178, commencing at time $t_{root}=7$ and $t_C=1$.

Thus, root 200 sequentially receives the first two seconds of clip A from Read A operator 152, one second of dissolve from A to B from Dissolve operator 182 of the third second of A and the first second of B, the next three seconds of clip B from Read B operator 158, one second of dissolve from B to C from Dissolve operator 182 of the fourth second of B and the first second of C and then the next two seconds of clip C from Read C operator 162.

Figure 4:
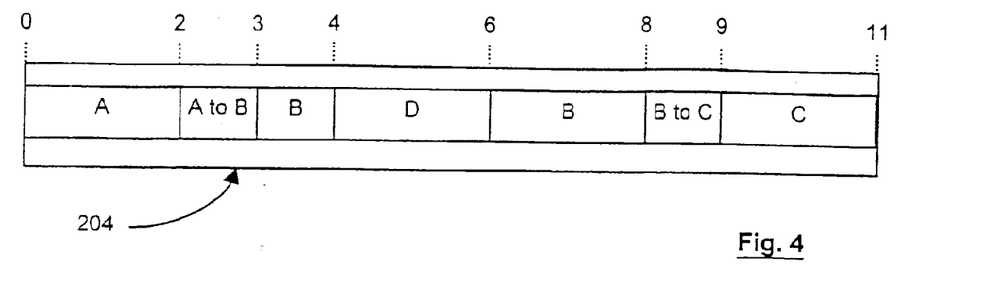
FIG. 4 shows another time line of an edit.
Figure 5:
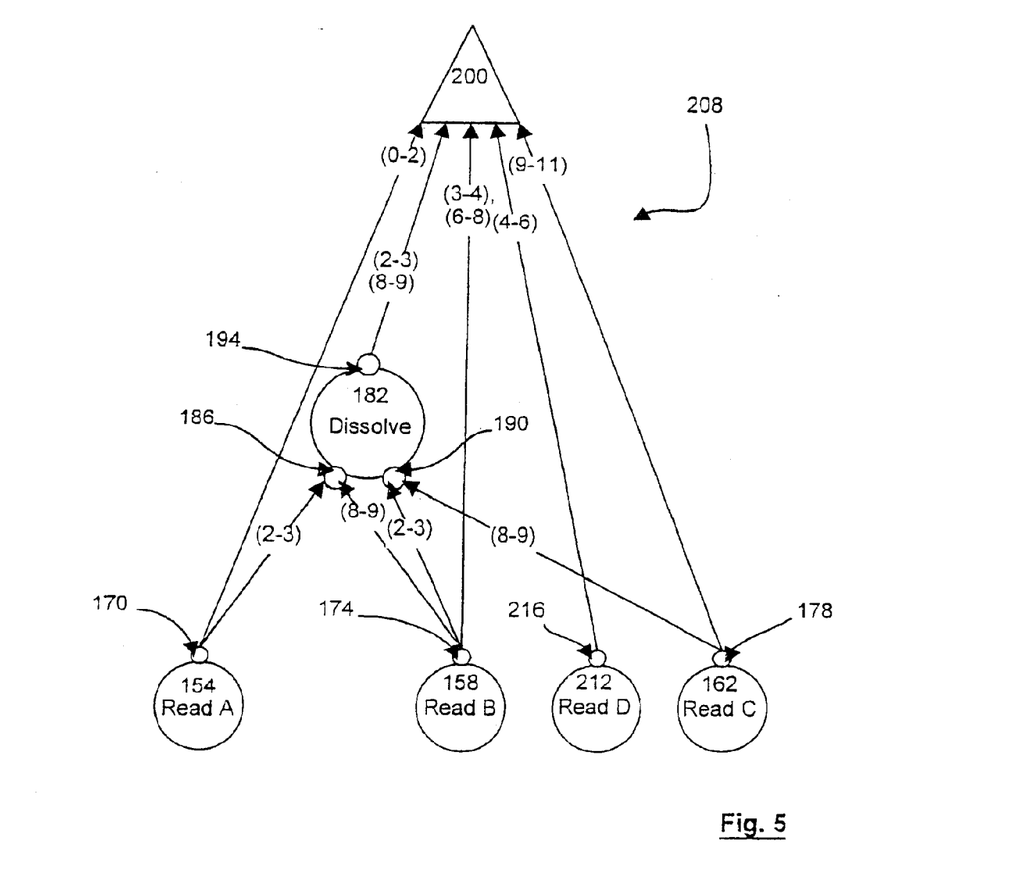
FIG. 5 shows an operator graph implementing the time line of FIG. 4.

By maintaining times relative to each object ($t_A$, $t_B$, etc.) and by allowing time-multiplexed (i.e. time-varying, multiple) connections relative to the root of the graph ($t_{root}$), time line 20 may be subsequently modified in a relatively straightforward manner. For example, if two seconds of a fourth clip 'D' is inserted into time line 20 at $t_{root}=4$, splitting clip B into one second and two second portions, an eleven second duration time line 204 is obtained, as shown in FIG. 4. An operator graph 208 for time line 204 is shown in FIG. 5 and corresponding portions of operator graph 208 and operator graph 150 are indicated with the same reference numerals. As shown, a Read D operator 212 has been added to operator graph 208 and Read D operator 212 includes a port 216. Read D operator 212 and port 216 are similar, or the same, in operation as Read A operator 154 except that Read D operator 212 can provide any specified portion of video clip 'D' from its corresponding storage device.

When clip D is inserted into time line 20 to obtain time line 204, operator graph 150 is updated to obtain operator graph 208 by adding Read D operator 212, and its port 216, and appropriately updating the times ($t_{root}$) associated with the connections between the objects in operator graph 208. Specifically, the connection time between port 174 of Read B operator 158 and root 200 at $t_{root}=3$ is changed to have a duration of one second, starting at $t_B=1$ and a second connection is established between port 174 and root 200 at $t_{root}=6$ for a duration of two seconds, commencing at time $t_B=2$. The connection between port 174 and input port 190 of Dissolve operator 182 is changed to commence at time $t_{root}=8$ with the same duration as before and the same start times for clips B and C. A connection between port 216 of Read D operator. 212 and root 200 is established, from time $t_{root}=4$, for a duration of two seconds starting at time $T_D=0$ and the connection between port 178 of Read C operator 162 is changed to commence at $t_{root}=9$, with a start time of $t_C=1$ being unchanged.

Figure 6:
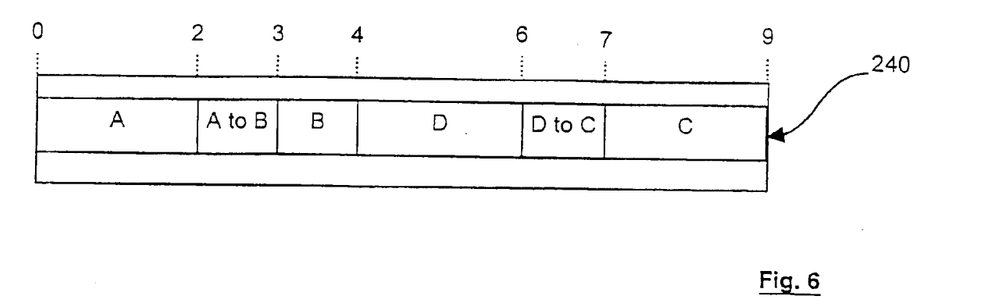
FIG. 6 shows another time line of an edit.
Figure 7:
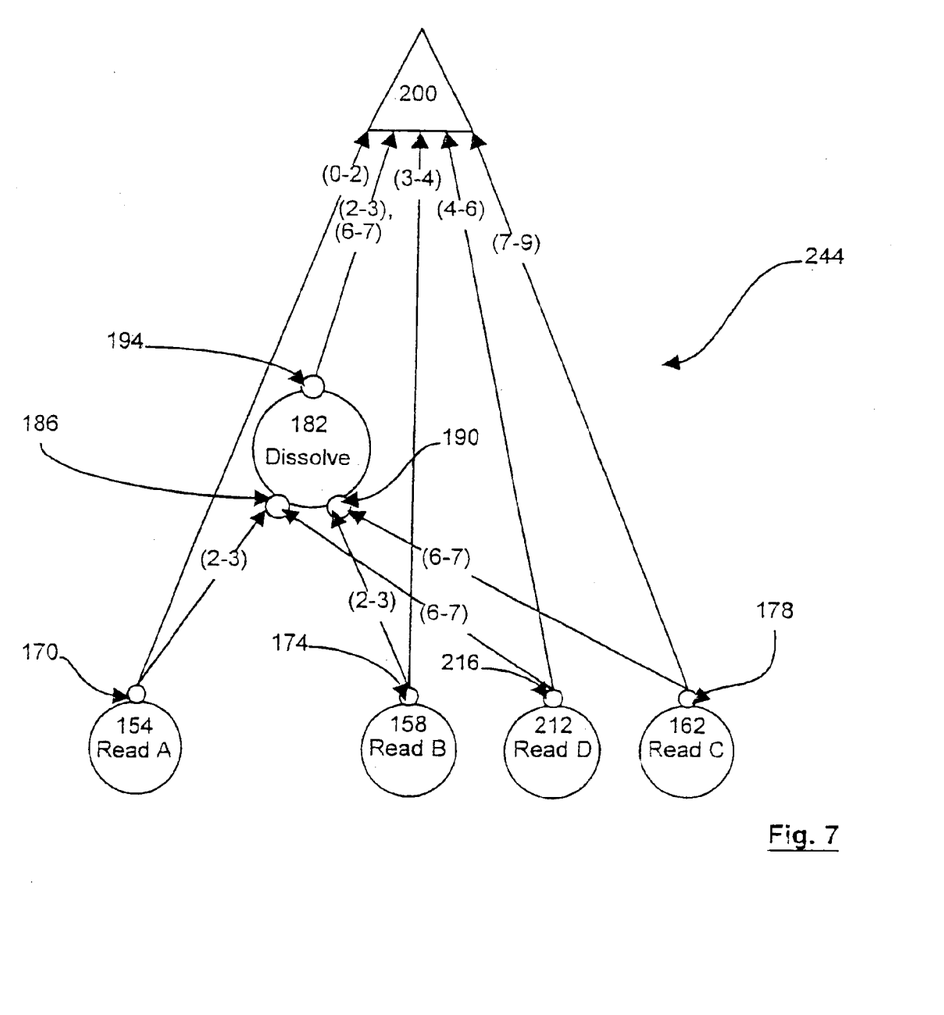
FIG. 7 shows an operator graph implementing the time line of FIG. 6.

If, instead of inserting two seconds of clip D into time line 20, it is desired to replace the last two seconds of clip B with two seconds of clip D and to implement a dissolve from D to C, as shown in time line 240 of FIG. 6, then operator graph 244, shown in FIG. 7, is obtained in a similar manner by appropriately updating the connections between operators ($t_{root}$) and the start times ($t_A$, $t_B$, etc.) of the clips and their durations.

The use of operator graphs allows NLE systems in accordance with the present invention to represent complex and/or long edits in a manner which the present inventors believe to be particularly efficient, both in terms of the use of hardware and software available to the NLE system and in the use of memory required to represent the time line. Redundant cloning of objects in the time line, such as Dissolve operator 182, are avoided and subsequent modification of the time line within the NLE system is easily accomplished.

While not illustrated in FIGS. 3 through 7, audio edits are accomplished in the same manner as the described video edits. Specifically, operators for audio sources, effects, etc. are arranged in an operator graph which provides time multiplexed connections. In an embodiment of the present invention, audio edits are performed on a separate time line, or time lines (right and left stereo channels, etc.), which share a common time base with the video time line and separate audio operator graphs are produced and processed. However, the present invention is not so limited and time lines and operator graphs which combine video and audio can be employed if desired. Further, it is contemplated that the present invention can be used in computer animations wherein 3D models are to be rendered and/or manipulated and these models and the manipulations to be performed upon them can be represented with operator graphs in accordance with the present invention. Specifically, the 3D models are treated like source operators and the manipulations to be performed on the models are treated like effect operators.

Figure 8A:
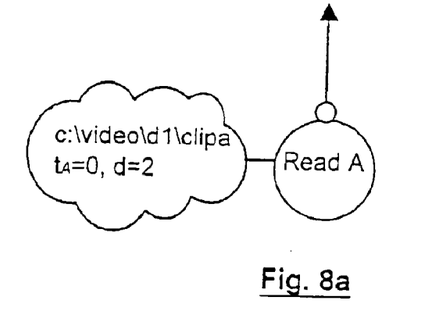

In the present invention, once an operator graph is constructed for a time line, whether audio, video, animation, etc., the edit is rendered by the NLE system using a series of expression trees which are extracted from the graph. Specifically, each expression tree is a simplified representation of a time slice of the operator graph, i.e.—the active branch or branches of the operator graph between transitions in the edit. For example, FIG. 8a shows the expression tree which is extracted from operator graph 208 in FIG. 5, for the time span of $t_{root}=0$ to 2 seconds.

Each node in an expression tree is a simplified representation of a node in the operator graph and these nodes are arranged in the expression trees to represent the connections and operations which are to be established during the time until the next transition of the time line. Each node includes the parameters required by the operator and a pointer to the corresponding operator object in the operator graph. The expression tree shown in FIG. 8a, represents the connection between Read A operator 154 and the root (the latter being implied and is not an explicit node in the expression tree) and includes the parameters to be passed to Read A operator 154 to read clip A. As shown, these parameters can include the file name and path to clip A, i.e. c:\video\d1\clipA, the desired duration, i.e. d=2 seconds, and the desired starting point in the clip, i.e. $t_A=0$.

As mentioned above, each node in an expression tree also includes a link (pointer) back to the respective operator object in the parent operator graph. In the event that additional functions, methods, information and/or parameters are required when the node in the expression tree is implemented by hardware or software in the NLE system, the node will use the appropriate link to pass a query for the needed information or a request for a method to the corresponding object in the operator graph. For example, if Read A operator 154 is capable of supplying clip A at two or more resolutions, the link from the node in the expression tree to the Read A operator object 154 in operator graph 208 can be used to query object 154 to determine the desired resolution. Similarly, if an effect such as a dissolve is to be implemented in software, the program code to implement the effect can be retrieved by the node in the expression tree from the corresponding operator object in the operator graph via these links.

The provision of a link between nodes in the expression tree and the corresponding operator objects allows those implementing operator objects and expression trees to make a tradeoff between the amount of information/number of methods a node in an expression tree includes versus the size of the node. If a node would exceed some determined preferred maximum size, those implementing the node can have the node retrieve some or all methods and information from the operator objects, as needed, to reduce the node's size.

Further, this link allows for nodes in expression trees to be implemented in a hardware and/or media independent manner. For example, as mentioned above, the node extracted from a Read operator can contain a filename and path for the source, a start time and a duration. While this may be sufficient for reading a video file from a file storage system, it may not be sufficient for rendering an animation of a 3D model. In this latter case, in addition to the filename, path, start time and duration, the NLE system can require that a rendering engine be specified, along with various related parameters, such as rendering resolution, camera point of view, etc. This latter information can be obtained by the NLE system, when processing the node, by following the link to the corresponding operator object and querying it for the additional required parameters.

Figure 8B:
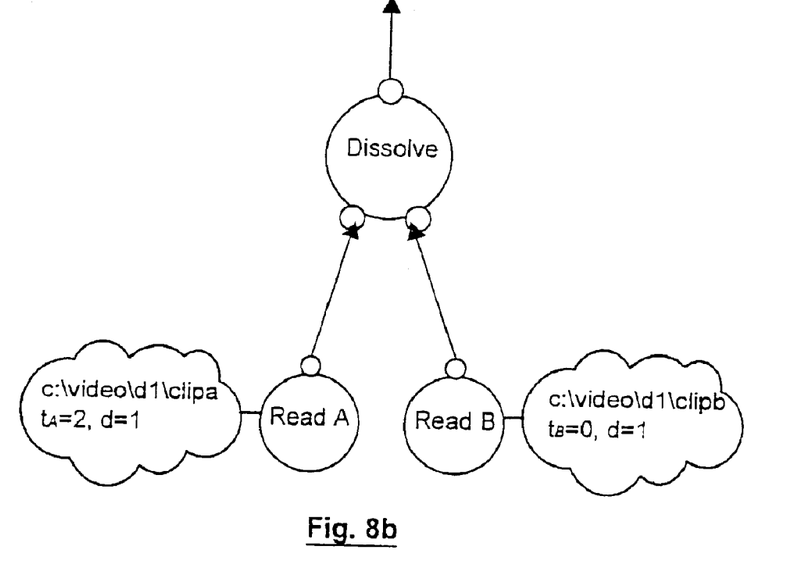
Figure 8C:
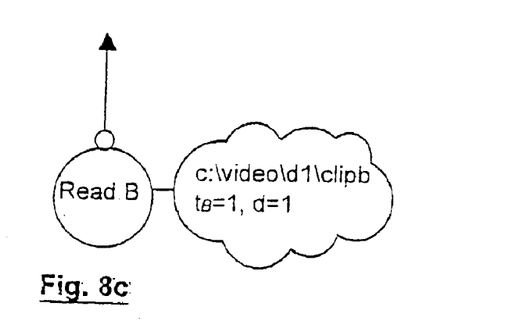
Figure 8D:
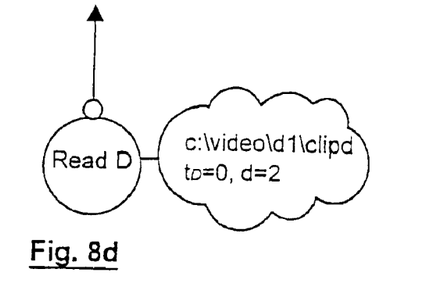
Figure 8E:
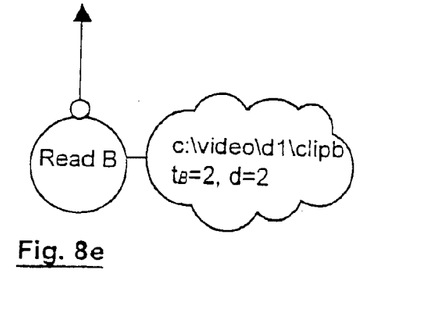
Figure 8F:
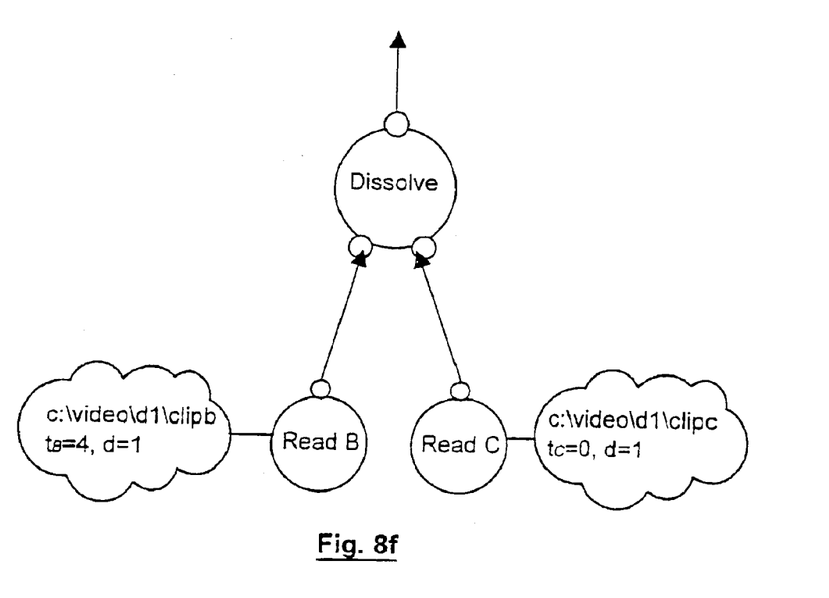

FIG. 8*b* shows the expression tree for the time span of $t_{root}$=2 to 3 seconds for operator graph 208, wherein a dissolve from A to B is desired. The expression tree shown in FIG. 8*c* shows the time span of $t_{root}$=3 to 4 seconds for operator graph 208, FIG. 8*d* shows the expression tree for the time span of $t_{root}$=4 to 6 seconds for operator graph 208, FIG. 8*e* shows the expression tree for the time span of $t_{root}$=6 to 8 seconds for operator graph 208, FIG. 8*f* shows the play list for the time span of $t_{root}$=8 to 9 seconds for operator graph 208 and FIG. 8*g* shows the expression tree for the time span of $t_{root}$=9 to 11 seconds for operator graph 208.

While operator graphs, such as operator graph 208, are constructed as a time line is created or modified and are stored in the NLE system for subsequent use and/or modification, expression trees are produced on an "as needed" basis. For example, while an edit is performed to create a time line, nodes for expression trees are extracted from the resulting operator graph as required and expression trees created to allow the user of the NLE system to view the time line during the edit session. As changes are made to the time line by the user of the NLE system, nodes and expression trees are created and/or destroyed appropriately. When a time line is completed, expression trees can be extracted from the operator graph which implements the time line to allow the time line to be rendered, or the operator graph can be stored for subsequent recall and/or rendering. In this later case, expression trees are extracted from the retrieved operator graph, as needed.

In a present embodiment of the instant invention, the expression trees have been defined as an LL1-type grammar, in that they are associative and they are evaluated from left to right. Therefore, the expression tree of FIG. 8*b*, which represents a one second A to B dissolve, is performed with the dissolve occurring from A (left) to B (right).

The present inventors believe that the use of expression trees in the present invention provides a number of advantages. For example, as described in more detail below, expression trees can be mapped to hardware in a flexible manner. Further, as is also described in more detail below, expression trees can be examined in a relatively straightforward manner to determine if an expression tree extracted from a time line can be rendered in real time. If the effects/operations in the expression tree can not be rendered in real time, the expression tree can then be split into sub-trees, one or more of which can be pre-rendered, when capacity exists, and stored as an intermediate result. The intermediate result is then substituted into the remaining sub-trees of the expression tree, thus allowing the overall rendering to be accomplished in real time on the available hardware/software of the NLE system.

Also, a determination can be made as to which nodes require hardware for implementation and which nodes can be implemented in software to allow, for example, the efficient use of hardware resources in the NLE system.

In processing the operator graph, a structure referred to as a playlist is created and passed to the NLE system rendering hardware and/or software via a Hardware Abstraction Layer (HAL). This playlist contains the start time (expressed relative to the root of the operator graph, i.e. $t_{root}$) and the duration of the time span to be rendered and a link (pointer) to the expression tree which represents the time span. Essentially, the HAL accepts the playlist, retrieves the expression tree it points to and translate the nodes of the expression tree into a form which can be executed by the hardware/software present in the editing system to achieve the edit. In order to provide the desired degree of flexibility, the present inventors have implemented the HAL such that a hardware manufacturer, software or hardware effect developer or any other interested third party can extend the HAL as needed to support new hardware and/or effects.

Specifically, an interested third party creates an object which implements an operator. The creation of this object is achieved by instantiating an operator object from an operator class and defining procedures to implement the user interface for the object, as well as an expression tree node which can be extracted for the operator. The third party then merely ensures that its hardware or software can appropriately process the resulting node in the expression tree. The new operator is now available for inclusion in a time line and, when included, a suitable node will be extracted for the related expression tree. When the expression tree is processed, the node is passed to the third party hardware or software HAL associated with operator and is processed accordingly.

Thus, as new hardware and/or effects are created and released by a third party, they can simultaneously release an operator object and related node for an expression tree which allows an NLE system, in accordance with the present invention, to utilize the hardware and/or effects.

One of the difficulties with prior art NLE systems and the like is that sources and effects implemented on different hardware and/or software can require different types and numbers of parameters. It is contemplated that one of the particular advantages of the HAL as implemented by the present inventors is that the these differences are not apparent to the user of the NLE system to whom the use of sources and/or effects is consistent and transparent. Further, it is relatively easy for a third party to provide support for the new sources and effects they produce, thus allowing easy and quick adoption of the new sources and effects by users.

As an expression tree is processed by the NLE system hardware and/or software, one of the first steps performed is to determine whether the expression tree can be processed in real time on the NLE system. Specifically, a check is made between the capabilities and/or resources of the NLE system on which the expression tree is to be rendered and the requirements of the expression tree. To perform this check, a record of the resources of the NLE system is maintained and a walk is performed on the expression tree to determine the resources required by each node therein. As the walk is performed and nodes are examined, the various required resources are tagged "in use" in the resources list. If all the resources required for each node in an expression tree are available to be tagged, then the time line can be played in real time on the NLE system and further processing of the expression tree proceeds. If, on the other hand, one or more nodes require one or more resources which have already been tagged "in use", the time line cannot be performed in real time on the NLE system. In this latter case, the NLE system can prompt the user with a suitable prompt or take other appropriate action.

As an example, a walk of the expression tree shown in FIG. 8b will determine that this expression tree requires that a dissolve operator be available, that two read operators be available and that three data buses, one to transfer data from each of the sources to the dissolve and one to transfer data representing the output of the dissolve, be available in the NLE system.

Figure 9:
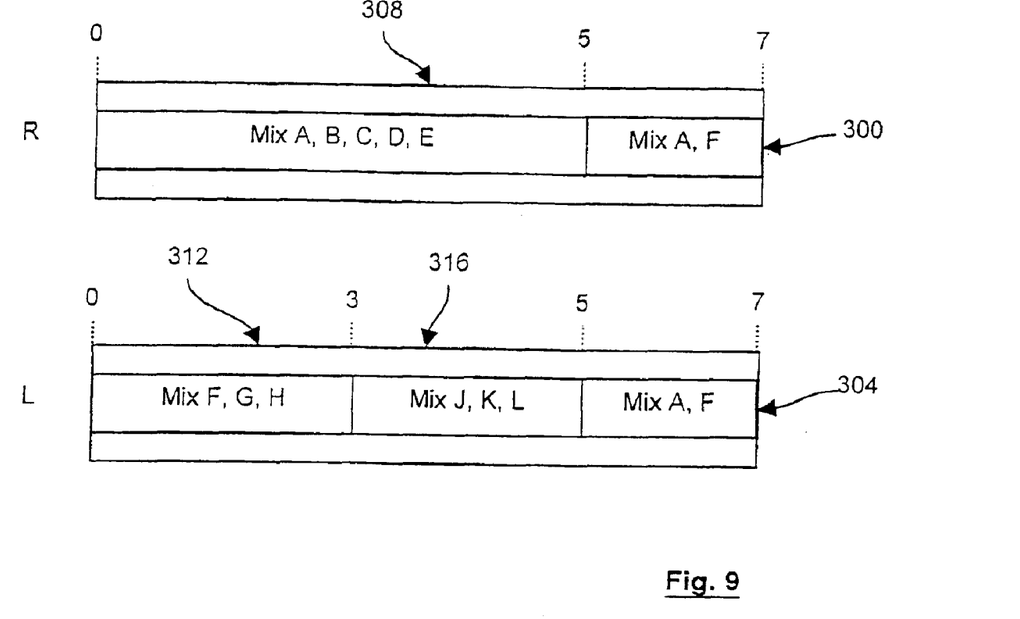
FIG. 9 shows an example of time lines for right and left audio channels.

In cases wherein more than one operator graph is being simultaneously processed by the NLE (for example if left and right stereo audio channels are being rendered) verification of the ability of the NLE to render the time lines is performed by walking each expression tree of each operator graph which overlaps on the common time base. FIG. 9 shows a pair of time lines 300 and 304 for right and left audio channels respectively. As shown, for the duration 308 from t=0 to t=5, the right channel audio time line 300 is a mix of five sources (A through E) and the expression tree for this duration, shown as 310 in FIG. 10, includes nodes representing five Read operators and a Mixer effect.

Figure 11A:
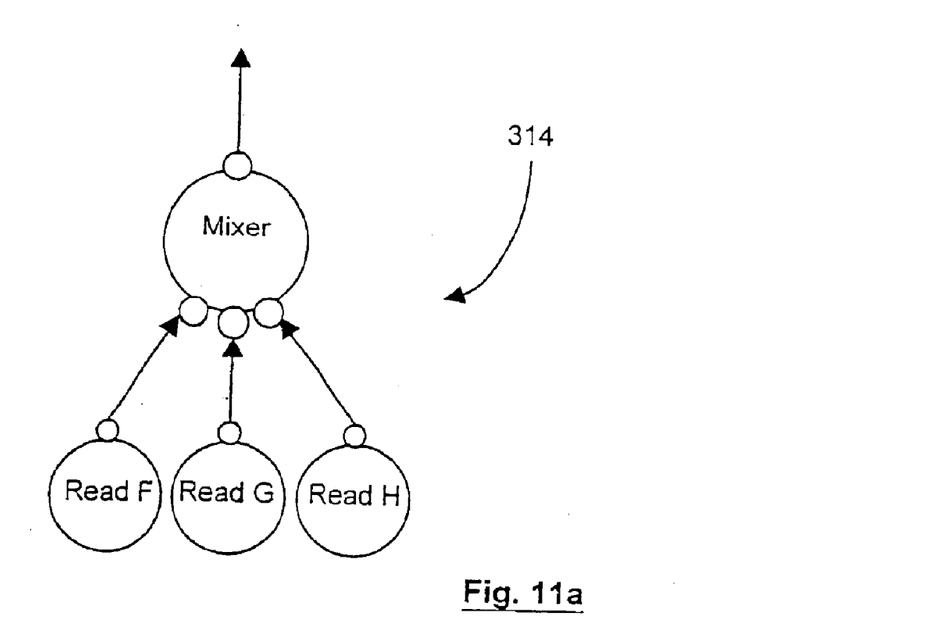
FIGS. 11a and 11b show expression trees for portions of the time line for the left audio channel of FIG. 9.
Figure 11B:
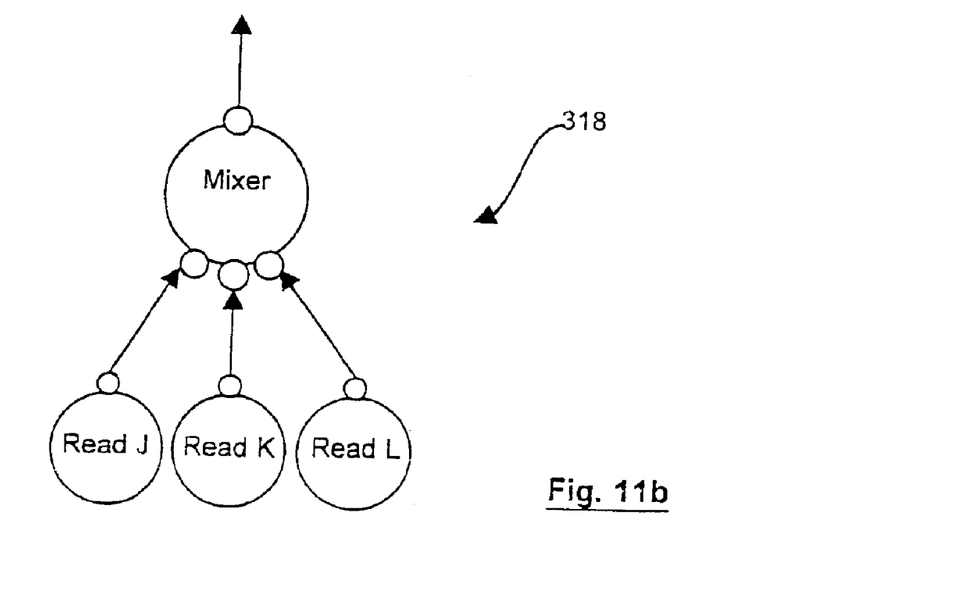

As is also shown, for duration 312 from t=0 to t=3, the left channel audio time line 304 is a mix of three sources (F, G & H) and the expression tree for this duration, shown as 314 in FIG. 11a, includes nodes representing three Read operators and a Mixer effect. Similarly, for the duration 316 from t=3 to t=5 time line 304 is a mix of three other sources (J, K & L) and the expression tree for this duration, shown as 318 in FIG. 11b, is a mix of nodes representing three Read operators and a Mixer effect.

Figure 10:
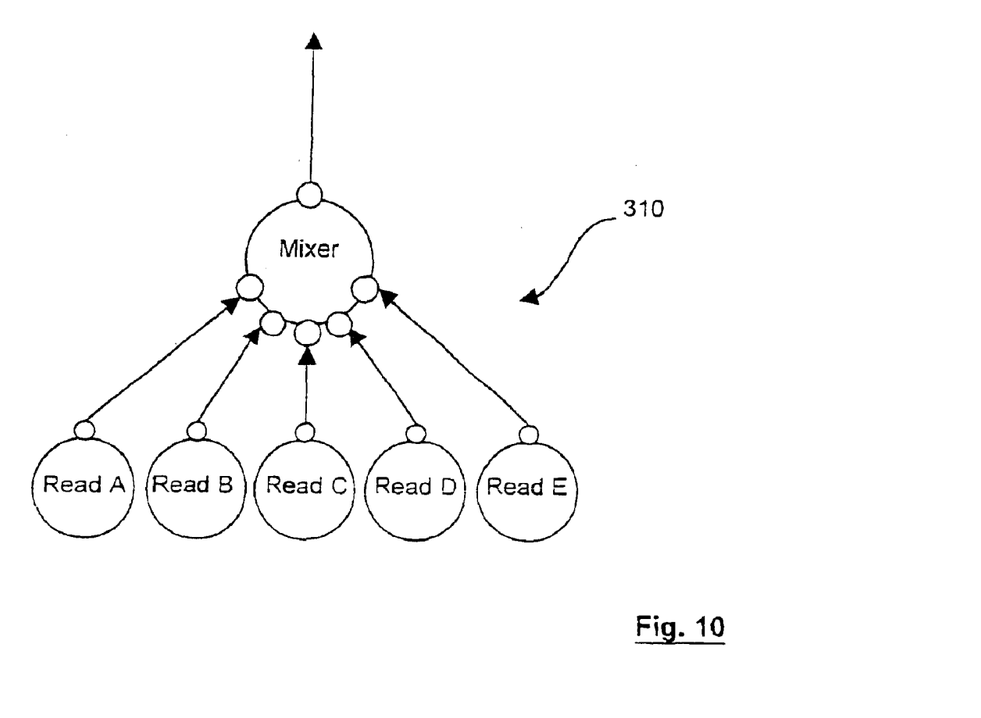
FIG. 10 shows a expression tree for a portion of the time line for the right audio channel of FIG. 9.

As duration 308 overlaps with both duration 312 and 316, expression trees 310 and 314 are first walked and the listed resources of the NLE system tagged. If sufficient resources are present in the NLE system, i.e.—in this particular example, if the NLE system includes at least eight read operators, two mixers and ten data busses, the tags are cleared from the listed resources and expression trees 310 and 318 are next walked and the listed resources of the NLE system tagged. It should be noted that, under this procedure, expression trees 312 and 316 do not influence each other and these expression trees are only considered against the expression tree 310 which they overlap with.

Depending upon the NLE system, it may not be required to consider overlaps in time lines of different types of source material. For example, an overlap between an audio time line and a video time line will not require consideration as described above if the NLE system's resources for audio and video are independent, i.e.—no shared busses, etc. In a preferred embodiment of the present invention, the extent to which the NLE system's resources are shared will be predetermined prior to the commencement of processing of expression trees.

Another perceived advantage of the present invention is the ability of an operator to represent a sub-operator graph. For example, as mentioned above, in editing an audio time line an operator graph can be constructed representing a mix of multiple sources and effects. This operator graph may be treated as a sub-graph which is represented by a single operator in a higher level operator graph and, when a node is extracted for an expression tree for this sub-graph operator, the underlying operators, sources and connections are extracted and rendered. When a walk of an expression tree containing a sub-graph is performed to verify that the rendering can be performed, the complete sub-graph is examined for resource usage. If the rendering cannot be performed in real time the sub-graph can be pre-rendered and the intermediate results from the pre-rendering stored for use when the expression tree containing the sub-graph is rendered. The use of sub-graphs provides for the encapsulation of some of the lower level details of a time line and/or the grouping of related objects into logical groups.

The present invention provides a novel non-linear editing system which employs operator graphs in novel representations of time lines. Simplified representations, called expression trees, of portions of the operator graphs are extracted for rendering and are believed particularly suited for examination to determine if the time line can be rendered by the NLE system in real time. Additionally, the use of a hardware abstraction layer and the expression trees provides a flexible and robust mechanism for adding new third party hardware and/or software functionality to the NLE system.

The above-described embodiments of the invention are intended to be examples of the present invention and alterations and modifications may be effected thereto, by those of skill in the art, without departing from the scope of the invention which is defined solely by the claims appended hereto.

What is claimed:

1. A method for rendering an edit of source material including time-based media, wherein the edit represents a plurality of time spans, comprising:

constructing a graph of operators corresponding to the edit, wherein each operator in the graph represents an operation employed in the edit, and wherein the graph includes connections among the operators, wherein different connections among the operators are active for different time spans, wherein the graph of operators represents a combination of operations used to render the edit at each point in time; and rendering the edit using the graph of operators by time multiplexing the connections defined among the operators according to the time spans when each connection is active.

2. The method of claim 1, wherein rendering comprises:

for each different time span, extracting an expression tree from the graph of operators, wherein each extracted expression tree represents the operators and connections among the operators that are active in the time span; and processing each extracted expression tree in time order to render the edit.

3. The method of claim 2, further comprising:
examining each extracted expression tree to determine if each of the operators and connections represented in the extracted expression tree is available for rendering the time span represented by the extracted expression tree.

4. The method of claim 3, further comprising:
if one or more of said operators and connections represented in a first expression tree is not available:
dividing the first expression tree into two or more sub-expression trees;
processing at least one of the two or more sub-expression trees to obtain an intermediate rendering result; and
storing the intermediate rendering result for subsequent incorporation in time order into the rendering of the edit.

5. The method of claim 1, wherein the source material comprises digital video information.

6. The method of claim 1, wherein the source material comprises digital audio information.

7. The method of claim 1, wherein the source material comprises three-dimensional model information.

8. The method of claim 1, wherein the source material comprises three-dimensional animation information.

9. The method of claim 1, wherein each node in an expression tree includes a link to the operator corresponding to the node, wherein the link allows information to be requested from the operator when the expression tree is processed.

10. The method of claim 1, wherein the operator graph is stored in a non volatile memory.

11. A computer program product comprising:
a computer readable medium;
computer program instructions stored on the computer readable medium that, when processed by a computer, instruct the computer to perform a method for rendering an edit of source material including time-based media, wherein the edit represents a plurality of time spans, comprising:
constructing a graph of operators corresponding to the edit, wherein each operator in the graph represents an operation employed in the edit, and wherein and the graph includes connections among the operators, wherein different connections among the operators are active for different time spans, wherein the graph of operators represents a combination of operations used to render the edit at each point in time; and
rendering the edit using the graph of operators by time multiplexing the connections defined among the operators according to the time spans when each connection is active.

12. The computer program product of claim 11, wherein rendering comprises:
for each different time span, extracting an expression tree from the graph of operators, wherein each extracted expression tree represents the operators and connections among the operators that are active in the time span; and
processing each extracted expression tree in time order to render the edit.

13. The computer program product of claim 12, wherein the method further comprises:
examining each extracted expression tree to determine if each of the operators and connections represented in the extracted expression tree is available for rendering the time span represented by the extracted expression tree.

14. The computer program product of claim 13, wherein the method further comprises:
if one or more of said operators and connections represented in a first expression tree is not available:
dividing the first expression tree into two or more sub-expression trees;
processing at least one of the two or more sub-expression trees to obtain an intermediate rendering result; and
storing the intermediate rendering result for subsequent incorporation in time order into the rendering of the edit.

15. The computer program product of claim 11, wherein the source material comprises digital video information.

16. The computer program product of claim 11, wherein the source material comprises digital audio information.

17. The computer program product of claim 11, wherein the source material comprises three-dimensional model information.

18. The computer program product of claim 11, wherein the source material comprises three-dimensional animation information.

19. The computer program product of claim 11, wherein each node in an expression tree includes a link to the operator corresponding to the node, wherein the link allows information to be requested from the operator when the expression tree is processed.

20. The computer program product of claim 11, wherein the operator graph is stored in a non volatile memory.

21. A computer program product comprising:
a computer readable medium;
computer program instructions stored on the computer readable medium that, when processed by a computer, instruct the computer to perform a method for processing a directed graph of operations defined for a plurality of time spans, comprising:
constructing a graph of operators, wherein each operator in the graph represents an operation, and wherein the graph includes connections among the operators, wherein different connections among the operators are active for different time spans, wherein the graph of operators represents a combination of operations to be performed at each point in time in the plurality of time spans; and
performing the combination of operations according to a time multiplexing of the connections defined among the operators according to the time spans when each connection is active.

* * * * *